United States Patent [19]

Fukuda

[11] Patent Number: 4,851,298

[45] Date of Patent: Jul. 25, 1989

[54] MULTI-LAYER TUBE OF A MUFFLER FOR AN INTERNAL COMBUSTION ENGINE

[75] Inventor: Masuo Fukuda, Omiya, Japan

[73] Assignee: Sankei Giken Kogyo Kabushiki Kaisha, Tokyo, Japan

[21] Appl. No.: 205,749

[22] Filed: Jun. 13, 1988

Related U.S. Application Data

[62] Division of Ser. No. 919,499, Oct. 2, 1986, Pat. No. 4,793,544.

[30] Foreign Application Priority Data

Oct. 2, 1985 [JP] Japan .................................. 60-219714

[51] Int. Cl.⁴ ............................................. B32B 15/18
[52] U.S. Cl. .................................... 428/586; 138/142; 138/149; 138/151; 138/163; 138/171; 181/222; 181/227; 181/244; 181/252; 428/594; 428/653; 428/659; 428/683; 428/685
[58] Field of Search ............... 428/586, 594, 653, 659, 428/683, 685; 138/142, 143, 149, 151, 163, 171; 181/196, 222, 227, 228, 244, 252, 282

[56] References Cited

U.S. PATENT DOCUMENTS

| | | | |
|---|---|---|---|
| 2,966,226 | 12/1960 | Kalis | 181/243 |
| 3,337,939 | 8/1967 | Parkinson | 181/282 |
| 4,010,886 | 3/1977 | Santos | 228/173.6 |
| 4,333,545 | 6/1982 | Roberts | 181/282 |
| 4,413,657 | 11/1983 | Sasaki et al. | 181/228 |
| 4,428,420 | 1/1984 | Blakely | 228/173.6 |

FOREIGN PATENT DOCUMENTS

| | | | |
|---|---|---|---|
| 5871 | 2/1970 | Japan | 138/143 |
| 83622 | 5/1982 | Japan . | |

*Primary Examiner*—Robert McDowell
*Attorney, Agent, or Firm*—Birch, Stewart, Kolasch & Birch

[57] ABSTRACT

A tube of a muffler for an internal combustion engine includes at least two generally rectangular sheets which are joined together at one end by crimping and wound in a tubular configuration to constitute two consecutive layers. In the tubular configuration, the other end of each of the two sheets overlaps the sheet itself and welded to the latter straddling a coupling portion where the two sheets are joined. While one of the sheets which constitutes an inner layer of the tube is made of a material which is resistive to corrosion due to chemical reactions with combustion gas and others flowing through the tube, the other which constitutes an outer wall of the same is made of a material which withstands adverse ambient conditions such as briny air and high humidity.

7 Claims, 3 Drawing Sheets

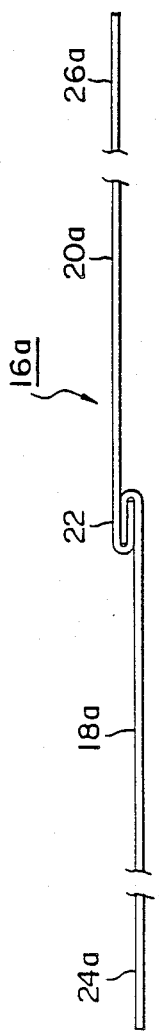
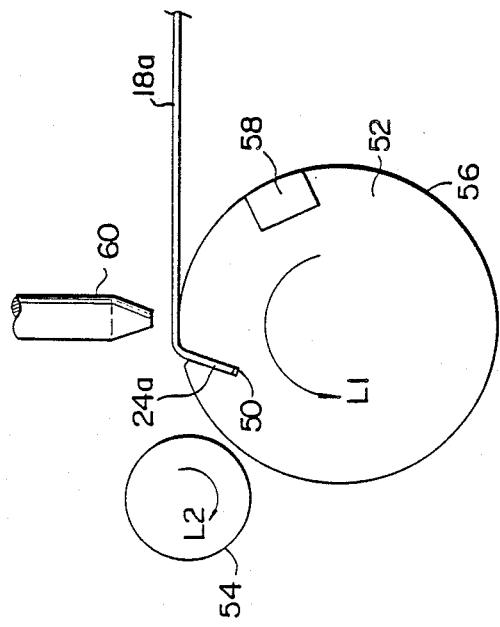

MULTI-LAYER TUBE OF A MUFFLER FOR AN INTERNAL COMBUSTION ENGINE

This application is a divisional of copending application Ser. No. 919,499, filed on Oct. 2, 1986, now U.S. Pat. No. 4,793,544.

BACKGROUND OF THE INVENTION

1. Field of the Invention

The present invention relates to a muffler for use with an internal combustion engine and, more particularly, to a multi-layer tube of the muffler and a method of producing the same.

2. Description of the Prior Art

A tube of a muffler for use with an internal combustion engine is susceptible to corrosion on both the inner and outer surfaces thereof. Specifically, corrosion of the inner surface is caused by chemical reactions with water condensed in and entrained by exhaust gas and with a catalyst adapted for exhaust emission control, while corrosion of the outer surface is brought about by briny air, high humidity and other environment conditions under which a muffler is often used. That is, the cause of corrosion differs from the inner surface to the outer surface of the tube.

There has been proposed a tube for an automotive muffler having a plurality of concentric layers which are individually made of particular materials matching the different causes of corrosion as stated above, as disclosed in Japanese Patent Laid-Open Publication No. 83622/1982. The prior art multi-layer muffler is produced by laying a sheet of stainless steel on a sheet of aluminum-plated steel and, then, directly rolling the two sheets together. In detail, such a muffler is produced by winding the two sheets made of different materials at least one turn by rolling. The production, therefore, requires a considerable compression force for winding which has to be implemented with a highly rigid rolling machine. Further, it is necessary for the two blanks to be positioned with extreme care so as not to be dislocated relative to each other.

SUMMARY OF THE INVENTION

It is therefore an object of the present invention to provide a tube of a muffler for an internal combustion engine which eliminates the above-discussed drawbacks and can be produced with efficiency.

In accordance with the present invention, there is provided a substantially cylindrical tube of a muffler for use with an internal combustion engine comprising a generally rectangular first sheet which is wound in a tubular configuration such that the sheet overlaps itself partially, and a generally rectangular second sheet having end portions which extend in an axial direction of the tube and one of which is joined by crimping with one end portion of the first sheet which extend parallel to the axial direction of the tube. The second sheet is wound on an outer periphery of the first sheet in a tubular configuration such that the second sheet partially overlaps itself straddling a portion where the first and second sheets are jointed by crimping. The first sheet is dimensioned in a circumferential direction of the tube such that the other end portion overlaps a portion of the first sheet which is wound in the tubular configuration. The second sheet is dimensioned in a circumferential direction of the tube such that the other end portion overlaps a portion of the second sheet which is wound in the tubular configuration, the overlapping portions being welded together.

In accordance with the present invention, there is also provided a substantially cylindrical tube of a muffler for use with an internal combustion engine comprising a generally rectangular first sheet which is wound in a tubular configuration such that the sheet overlaps itself partially, a generally rectangular second sheet having end portions which extend in an axial direction of the tube and one of which is joined by crimping with one of end portions of the first sheet which extend parallel to the axial direction of the tube, the second sheet being wound on an outer periphery of the first sheet in a tubular configuration such that the second sheet partially overlaps itself straddling a portion where the first and second sheets are joined by crimping, and a generally rectangular third sheet having end portions which extend parallel to the axial direction of the tube and one of which is joined by crimping with the other end portion of the second sheet. The third sheet is wound on an outer periphery of the second sheet in a tubular configuration such that the third sheet partially overlaps itself straddling a portion where the second and third sheets are joined by crimping. The first sheet is dimensioned in a circumferential direction of the tube such that the other end portion of the first sheet overlaps a portion of the first sheet which is wound in the tubular configuration. The second sheet is dimensioned in the circumferential direction of the tube such that the other end portion of the second sheet overlaps a portion of the second sheet which is wound in the tubular configuration. Further, the third sheet is dimensioned in the circumferential direction of the tube such that the other end portion of the third sheet overlaps a portion of the third sheet which is wound in the tubular configuration, the overlapping portions being welded together.

In accordance with the present invention, there is further provided a method of producing a substantially cylindrical tube of a muffler for use with an internal combustion engine comprising the steps of preparing first and a second generally rectangular sheets each of which is dimensioned in a circumferential direction of the tube such that one of the end portions of the sheet which are parallel to an axial direction of the tube overlaps a portion of the sheet which is wound in a tubular configuration, joining the other end of the first and second sheets by crimping, inserting the one end portion of the first sheet in a slot of a mandrel which extends parallel to an axial direction of the mandrel, driving the mandrel in a rotational motion while pressing a roller toward the mandrel against the first and second sheets which are sequentially wrapped around the periphery of the mandrel in a tubular configuration, whereby the first sheet is wound in a tubular configuration such that the first sheet overlaps with the one end portion thereof, and the second sheet is wound in a tubular configuration on the outer periphery of the first sheet such that one end portion of the second sheet overlaps the second sheet, and welding the second sheet and the one end portion thereof which overlap each other.

Further scope of applicability of the present invention will become apparent from the detailed description given hereinafter. However, it should be understood that the detailed description and specific examples, while indicating preferred embodiments of the invention, are given way of illustration only, since various changes and modifications within the spirit and scope of the invention will become apparent to those skilled in the art from this detailed description.

BRIEF DESCRIPTION OF THE DRAWINGS

The objects and features of the present invention will become more apparent from the consideration of the following detailed description taken in conjunction with the accompanying drawings which are given by way of illustration only, and thus, are not limitative of the present invention, and in which:

FIG. 3 is a side elevation showing blanks in one of steps of producing the tube of FIG. 2;

FIG. 4 is a schematic view representative of a wraping step in accordance with the same embodiment;

DESCRIPTION OF THE PREFERRED EMBODIMENTS

Figure 1:
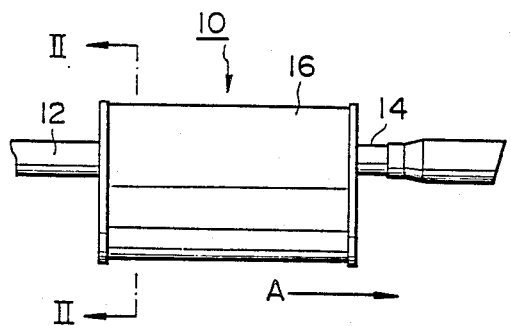
FIG. 1 is a side elevation showing an embodiment of a muffler for an internal combustion engine to which the present invention is applied.

Referring to FIG. 1 of the drawings, a muffler for an internal combustion engine to which the present invention is applied is shown and generally designated by the reference numeral 10. As shown, the muffler 10 is connected at one end to an exhaust pipe 12 and at the other end to a tail pipe 14. The muffler 10 comprises a tubular body, or tube, 16.

Figure 2:
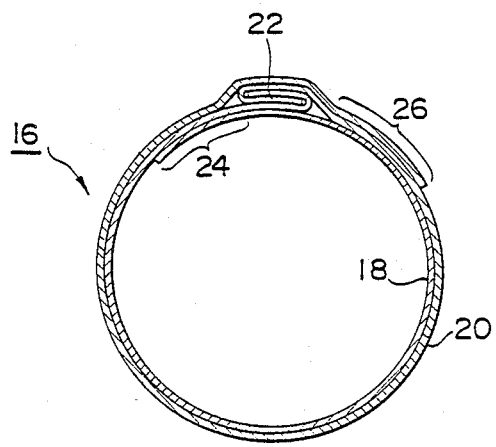
FIG. 2 is a section along line II—II of FIG. 1, showing a tube of the muffler.

As shown in FIG. 2, the tube 16 is made up of two sheets 18 and 20 which are configured in a multi-layer structure. One of the sheets, e.g., the sheet 18 is made of stainless steel which is resistive to combustion gas and condensed water derived from the combustion gas, which flow through the tube 16. The other sheet, i.e., the sheet 20 in this example is made of steel which is treated for resistively against briny air as typified by an aluminum- or zinc-plated steel sheet. Depending upon the situation in which the muffler 10 is used and the conditions surrounding the muffler 10, the aluminum- or zinc-plated steel sheet may be applied to the sheet 18, which defines the inner wall of the muffler 10, and the stainless steel sheet to the sheet 20 which defines the outer wall of the same.

In this particular embodiment, the tube 16 has a substantially circular cross-section. As shown in FIG. 2, one widthwise end of the sheet 18, i.e., one end which extends in an axial direction A of the tube 16, FIG. 1, is connected to the sheet 20 by crimping to constitute a coupling portion 22. The other end portion 24 of the sheet 18 overlaps and is welded to the sheet 18 itself. Likewise, the other end portion 26 of the other sheet 20 overlaps and is welded to the sheet 20 itself. In this manner, the tube 16 of the muffler 10 is provided with a generally cylindrical configuration. Where the coupling portion 22 is dimensioned, for example, 10 millimeters as measured in the circumferential direction, it is preferable that each of the overlapping portions 24 and 26 of the sheets 18 and 20 be about 15 to 20 millimeters long.

The muffler 10 having the above construction is produced as follows. First, as shown in FIG. 3, a pair of generally rectangular sheet blanks 18a and 20a are each bent, or crimped, in a U-shape at one end thereof, then mated together along the U-bends, and then pressed together. As a result, the blanks 18a and 20a are joined to each other by the coupling portion 22 to form a single elongate sheet, generally 16a. Because the blanks 18a and 20a are different from each other in material, it is generally difficult to weld them together. While spot-welding or full-surface welding may be positively employed to connect the blanks 18a and 20a along the coupling portion 22, the former technology would invite leakage of exhaust gas through the coupling portion 22 and the latter would result in the need for a substantial number of extra steps and substantial power and, therefore, disproportionate cost. In contrast, the crimping type connection as stated above is easy to perform and inexpensive and, moreover, ensures a sufficient sealing ability against exhaust gas.

Assume that the blank 18a is to constitute the inner tube part 18 by way of example. As shown in FIG. 4, the free end 24a of the blank 18a is inserted into, for example, a slot 50 which is formed in a mandrel 52. Then, the mandrel 52 is rotated in a direction indicated by an arrow $L_1$ while, at the same time, a pressure roller 54 located adjacent to the mandrel 52 is pressed against the mandrel 52, thereby wrapping the blank 18a around the mandrel 52. The blank 18a is dimensioned such that it overlaps itself over a predetermined length 24 after one turn around the mandrel 52.

When the blank 18a has overlapped itself over the length 24 after one turn around the mandrel 52 as stated above, it forms the entire inner periphery of the inner tube part 18. The overlapping portion 24 of the blank 18a may be welded at this stage of production. As the mandrel 52 is further rotated, the other blank 20a is wrapped around the blank 18a. The wrapping operation is completed when the free end 26a of the blank 20a has overlapped the blank 20a itself over a predetermined length 26 straddling the coupling portion 22.

Under the condition described above, an electrode 58 provided in a part of the outer periphery 56 of the mandrel 52 and an electrode 60 disposed above the periphery 56 of the mandrel 52 are activated to spot-weld the overlapping portion 26 of the blank 20a. The substantially cylindrical tube 16 is completed by such a procedure and, then, removed from the mandrel 52. It is to be noted that welding the blank 20a at the overlapping portion 26 is easy since the blank 20a is made of a single material.

Figure 5:
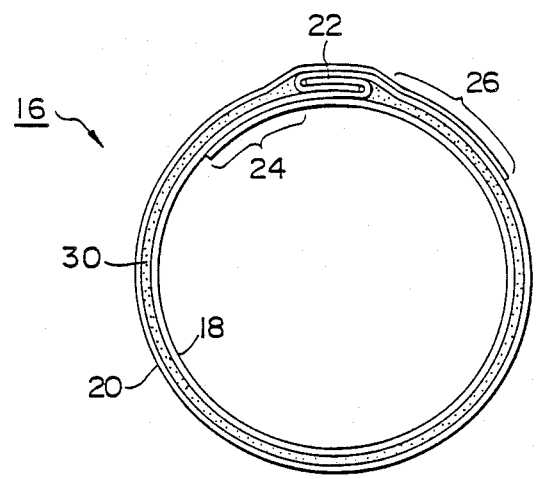
FIG. 5 is a view similar to FIG. 2, showing a three-layer tube in accordance with an alternative embodiment of the present invention.

Referring to FIG. 5, another embodiment of the present invention is shown. In FIG. 5, the same or similar structural elements as those shown in FIG. 2 are designated by like reference numerals. As shown, the tube 16 of FIG. 5 has a three-layer structure made up of the inner and outer tube parts 18 and 20 plus an intermediate buffer layer 30. Specifically, the buffer layer 30 which may be made of a sound absorbent material, for example, is laid between the tube parts 18 and 20 by applying it to that surface of the blank 20a which is to constitute the inner surface, i.e., underside while the blank 20a is wrapped around the mandrel 52.

Figure 6:
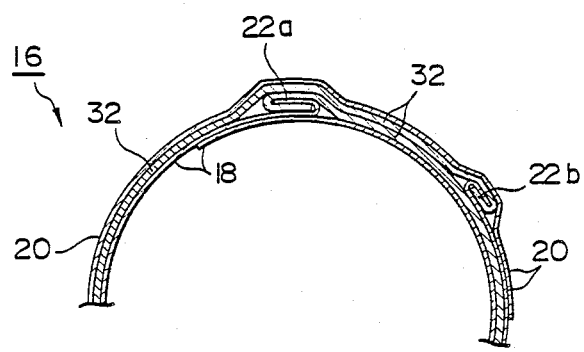
FIG. 6 is a fragmentary section of a three-layer tube in accordance with still another embodiment of the present invention.

FIG. 6 shows still another embodiment of the present invention which also employs a three-layer structure. In FIG. 6, the same or similar structural elements as those shown in FIG. 5 are designated by like reference numerals. In the tube 16 of FIG. 6, both the inner and outer sheets 18 and 20 are made of a corrosion resisting material such as stainless steel. Interposed between the sheets 18 and 20 is a sheet 32 which comprises, for example, SPCC (plain steel sheet). This kind of structure minimizes the amount, inclusive of length and thickness, of the highly corrosion resisting and expensive material 18 and 20 which is necessary for the tube 16 to be completed. However, simply providing the inner and outer tubes 18 and 20 would bring about problems such as transmission of exhaust noise through the tube 16 due to their short thickness. Such problems can be advantageously solved by using the steel sheet 32 which is inexpensive and sufficiently thick.

Figure 7:
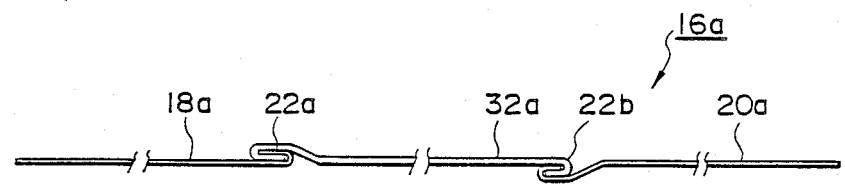
FIG. 7 is a side elevation of blanks in one of the steps of producing the tube of FIG. 6.

As shown in FIG. 7, the three-layer tube 16 of FIG. 6 consists of three blanks 18a, 32a and 20a which are joined together at coupling portions 22a and 22b by crimping. The resultant sheet 16a is rolled and welded as previously described. It is to be noted that the crimped portions 22a and 22b of the sheet 16a may each be configured convex either outwardly of the tube 16 to be produced, i.e., upwardly as viewed in FIG. 7 or inwardly of the same, i.e., downwardly as desired. Further, even a tube having four or more layers may advantageously be produced by the same method as the three-layer tube.

The rolling process as previously stated may be implemented with a mandrel having a fixed diameter, which corresponds to that of a particular tube 16 to be produced, and a pressure roller cooperative with the mandrel. This, however, results in a prohibitive equipment cost when it is desired to produce tubes 16 having various diameters.

Another possible implementation for the production of tubes 16 having a wide range of diameters is using a pressure roller made of urethane foam and other elastic materials as the roller 54, FIG. 4, together with a single mandrel having a predetermined diameter. The elastic roller 54 is to effectively utilize spring-back of the sheet 16a which has underwent wrapping operation. The mandrel 50 may advantageously be implemented with one having a fixed diameter and made of iron, for example. The sheet 16a is wound around the mandrel 50 while being nipped between the mandrel and the urethane roller, the urethane roller being pressed against the mandrel to provide the sheet 16a with a tubular configuration. Subsequently, the tubular sheet 16a is removed from the mandrel and then fixed to a desired diameter, followed by spot-welding or otherwise rigidly joining the overlapping portion 26.

In accordance with the above-described procedure, the roller is elastically deformable so that the tube 16 may be provided with any desired diameter by adjusting the pressure force which acts between the elastic roller and the mandrel. Alternatively, a collar of a desired diameter, not shown, may be applied to the outer periphery of a mandrel which has a fixed diameter and driven by the mandrel for rotation, the sheet 16a being inserted between the collar and the pressure roller. All of these methods eliminate the need for mandrels each having a particular diameter and, thereby, cut down the equipment cost.

In summary, it will be seen that in accordance with the present invention there is provided a multi-layer tube which is simple in structure and highly resistive to corrosion on both of the inner and outer surfaces thereof. The tube is positively sealed in spite of the simple structure and produced by substantially the same principle as a prior art tube which is a roll of a single sheet. It will be needless to mention that the present invention is effectively applicable not only to a tube having a circular cross-section but to those having oval and other smooth cross-sections.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A substantially cylindrical tube for a muffler for use with an internal combustion engine, comprising:
   a generally rectangular first sheet having end portions, said first sheet being wound in a tubular configuration such that said sheet overlaps itself partially; and
   a generally rectangular second sheet having end portions which extend in an axial direction of said tube and having one end portion joined by crimping with one end portion of said first sheet which extends parallel to said axial direction of said tube, said second sheet being wound on an outer periphery of said first sheet in a tubular configuration such that said second sheet partially overlaps itself straddling a portion where said first and second sheets are joined by crimping;
   said first sheet being dimensioned in a circumferential direction of said tube such that the other end portions overlaps a portion of said first sheet which is wound in the tubular configuration;
   said second sheet being dimensioned in a circumferential direction of said tube such that the other of said end portions overlaps a portion of said second sheet which is wound in the tubular configuration, said overlapping portions being welded to each other;
   whereby said tube with a substantially cylindrical configuration is formed.

2. A tube in accordance with claim 1, wherein said first sheet comprises a steel sheet which is plated with a material selected from the group consisting aluminum and zinc.

3. A tube in accordance with claim 1, wherein said first sheet comprises a steel sheet which is plated with a material selected from the group consisting of aluminum and zinc, said second sheet comprising a stainless steel sheet.

4. A tube in accordance with claim 1, wherein said overlapping portions of said second sheet are spot-welded to each other.

5. A tube in accordance with claim 1, further comprising a generally rectangular third sheet which includes a sound absorbent material and is wound between said first and second sheets.

6. A substantially cylindrical tube for a muffler for use with an internal combustion engine, comprising:
   a generally rectangular first sheet having end portions, said first sheet being which is wound in a tubular configuration such that said sheet overlaps itself partially;
   a generally rectangular second sheet having end portions which extend in an axial direction of said tube and having one end portion joined by crimping with one of end portion of said first sheet which extend parallel to said axial direction of said tube, said second sheet being wound on an outer periphery of said first sheet in a tubular configuration such that said second sheet partially overlaps itself straddling a portion where said first and second sheets are joined by crimping; and a generally rectangular third sheet having end portions which extend parallel to said axial direction of said tube and having one end portion joined by crimping with the other of said end portions of said second sheet, said third sheet being wound on an outer periphery of said second sheet in a tubular configuration such that said third sheet partially overlaps itself straddling a portion where said second and third sheets are joined by crimping;

said first sheet being dimensioned in a circumferential direction of said tube such that the other end portion of said first sheet overlaps a portion of said first sheet which is wound in the tubular configuration;

said second being dimensioned in said circumferential direction of said tube such that said other end portion of said second sheet overlaps a portion of said second sheet which is wound in the tubular configuration;

said third sheet being dimensioned in said circumferential direction of said tube such that the other of said end portions of said third sheet overlaps a portion of said third sheet which is wound in the tubular configuration, said overlapping portions being welded to each other;

whereby said substantially cylindrical tube is formed.

7. A tube in accordance with claim 6, wherein said first and third sheets are made of stainless steel, and said second sheet is made of plain steel.

* * * * *